(12) United States Patent
Yamayose

(10) Patent No.: US 9,102,114 B1
(45) Date of Patent: Aug. 11, 2015

(54) METHOD FOR MANUFACTURING ALUMINUM-TITANATE-BASED CERAMIC HONEYCOMB STRUCTURE

(71) Applicant: Ibiden Co., Ltd., Ogaki-shi (JP)

(72) Inventor: Kazunori Yamayose, Stuttgart (DE)

(73) Assignee: IBIDEN CO., LTD., Ogaki-shi (JP)

( * ) Notice: Subject to any disclaimer, the term of this patent is extended or adjusted under 35 U.S.C. 154(b) by 0 days.

(21) Appl. No.: 13/887,638

(22) Filed: May 6, 2013

Related U.S. Application Data

(60) Provisional application No. 61/787,186, filed on Mar. 15, 2013.

(51) Int. Cl.
*C04B 35/185* (2006.01)
*B29D 99/00* (2010.01)
*B32B 3/12* (2006.01)

(52) U.S. Cl.
CPC .............. *B29D 99/0089* (2013.01); *B32B 3/12* (2013.01)

(58) Field of Classification Search
USPC ................................................ 264/630, 631
See application file for complete search history.

(56) References Cited

U.S. PATENT DOCUMENTS

| | | | |
|---|---|---|---|
| 6,942,713 B2 * | 9/2005 | Ogunwumi et al. | 55/523 |
| 7,001,861 B2 * | 2/2006 | Beall et al. | 501/128 |
| 7,473,392 B2 * | 1/2009 | Wusirika | 264/631 |
| 7,687,008 B2 * | 3/2010 | Okazaki et al. | 264/442 |
| 7,914,874 B2 * | 3/2011 | Henry et al. | 428/116 |
| 2006/0064957 A1 * | 3/2006 | Ogunwumi et al. | 55/523 |
| 2007/0063398 A1 * | 3/2007 | Takahashi | 264/630 |
| 2008/0085393 A1 * | 4/2008 | Wusirika | 428/116 |
| 2009/0008830 A1 * | 1/2009 | Okazaki et al. | 264/442 |
| 2011/0151181 A1 * | 6/2011 | Liu | 428/116 |
| 2012/0198805 A1 * | 8/2012 | Iwasaki et al. | 55/523 |

FOREIGN PATENT DOCUMENTS

JP   2010-189204   9/2010

OTHER PUBLICATIONS

U.S. Appl. No. 13/872,483, filed Apr. 29, 2013, Yamayose.
U.S. Appl. No. 13/873,576, filed Apr. 30, 2013, Yamayose.
U.S. Appl. No. 13/873,379, filed Apr. 30, 2013, Yamayose.
U.S. Appl. No. 13/887,688, filed May 6, 2013, Yamayose.
U.S. Appl. No. 13/873,624, filed Apr. 30, 2013, Yamayose.
U.S. Appl. No. 13/873,763, filed Apr. 30, 2013, Yamayose.
U.S. Appl. No. 13/873,933, filed Apr. 30, 2013, Yamayose.

* cited by examiner

*Primary Examiner* — Joseph S Del Sole
*Assistant Examiner* — Russell Kemmerle, III
(74) *Attorney, Agent, or Firm* — Oblon, McClelland, Maier & Neustadt, L.L.P.

(57) ABSTRACT

A method for manufacturing a ceramic body having a honeycomb structure includes bringing titania particles and alumina particles into contact with each other such that the titania particles and the alumina particles are adhered to each other and form a precursor including particles having the titania particles and the alumina particles, combining the precursor with a binder material such that a raw material paste including the precursor and the binder material is prepared, forming a body including the raw material and having a honeycomb structure, and sintering the body having the honeycomb structure such that a ceramic body having the honeycomb structure is formed.

20 Claims, 6 Drawing Sheets

Cross-sectional view at line (A-A)

METHOD FOR MANUFACTURING ALUMINUM-TITANATE-BASED CERAMIC HONEYCOMB STRUCTURE

CROSS-REFERENCE TO RELATED APPLICATIONS

The present application is based upon and claims the benefit of priority from U.S. Application No. 61/787,186, filed Mar. 15, 2013, the entire contents of which are incorporated herein by reference.

BACKGROUND OF THE INVENTION

1. Field of the Invention

The present invention relates to a method for manufacturing an aluminum-titanate-based ceramic body with a honeycomb structure. More specifically, the present invention relates to a method for manufacturing an aluminum-titanate-based ceramic body with a honeycomb structure using a particulate precursor formed of titania particles and alumina particles.

2. Description of Background Art

Japanese Laid-Open Patent Publication No. 2010-189204 describes a method for manufacturing a granular aluminum-titanate sintered body, including a step for extruding and shaping a raw material mixture containing the granular aluminum-titanate sintered body and a step for sintering the body obtained by such an extrusion step. The entire contents of Japanese Laid-Open Patent Publication No. 2010-189204 are incorporated herein by reference.

SUMMARY OF THE INVENTION

According to one aspect of the present invention, a method for manufacturing a ceramic body having a honeycomb structure includes bringing titania particles and alumina particles into contact with each other such that the titania particles and the alumina particles are adhered to each other and form a precursor including particles having the titania particles and the alumina particles, combining the precursor with a binder material such that a raw material paste including the precursor and the binder material is prepared, forming a body including the raw material and having a honeycomb structure, and sintering the body having the honeycomb structure such that a ceramic body having the honeycomb structure is formed.

Another aspect of the present invention is a ceramic body having a honeycomb structure produced by processes including bringing titania particles and alumina particles into contact with each other such that the titania particles and the alumina particles are adhered to each other and form a precursor including particles having the titania particles and the alumina particles, combining the precursor with a binder material such that a raw material paste including the precursor and the binder material is prepared, forming a body including the raw material and having a honeycomb structure, and sintering the body having the honeycomb structure such that a ceramic body having the honeycomb structure is formed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
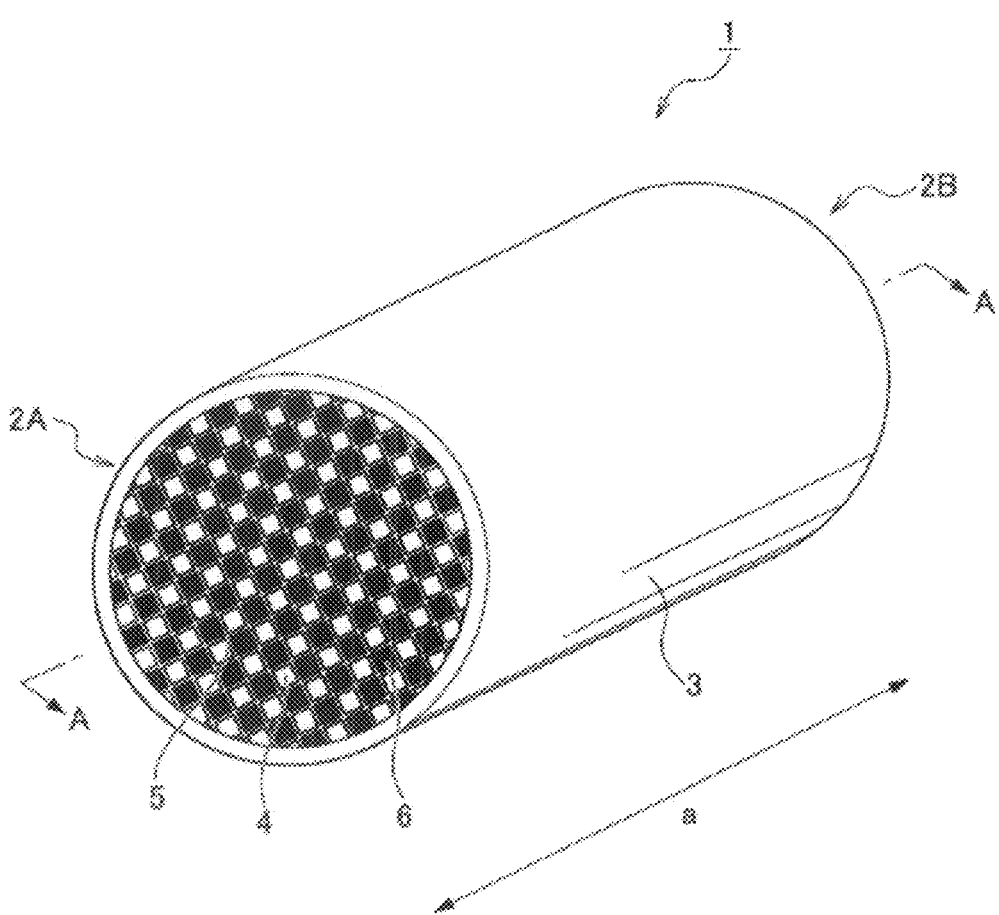
FIG. 1 is a perspective view schematically showing an example of a ceramic body with a honeycomb structure obtained by the manufacturing method according to an embodiment of the present invention.

The embodiments will now be described with reference to the accompanying drawings, wherein like reference numerals designate corresponding or identical elements throughout the various drawings.

FIG. 1 is a perspective view schematically showing an example of a ceramic body with a honeycomb structure obtained by the manufacturing method according to an embodiment of the present invention.

As shown in FIG. 1, a ceramic honeycomb structure according to an embodiment of the present invention is made of aluminum-titanate-based ceramic body 1 (aluminum-titanate-based sintered body), for example. Ceramic body 1 has two open end surfaces (2A, 2B) and side surface 3. Also, ceramic body 1 has multiple cells made of through-holes 4 and partitions 5 which section off through-holes 4. Through-holes 4 extend from end surface (2A) to end surface (2B) along a longitudinal direction of ceramic body 1 (direction along arrow (a) in FIG. 1), and through-holes 4 are sectioned off by partitions 5. In addition, either end of a through-hole 4 in a longitudinal direction (a) is sealed by sealant 6, while the other end is left open. Thus, through-hole 4 is sealed by sealant 6 only at either end. As shown in FIG. 1, end surfaces (2A, 2B) of ceramic body 1 are in a checkered pattern where predetermined portions are alternately sealed. However, end surfaces (2A, 2B) of ceramic body 1 are not limited to such a pattern and may be in any other sealant pattern. The sealant is not limited to any specific type, and a raw material paste made of titania particles and alumina particles or other ceramics may also be used.

The shape of ceramic body 1 may also be an elliptic cylinder, a rectangular prism or a polygonal prism instead of a circular cylinder as shown in FIG. 1.

Figure 2:
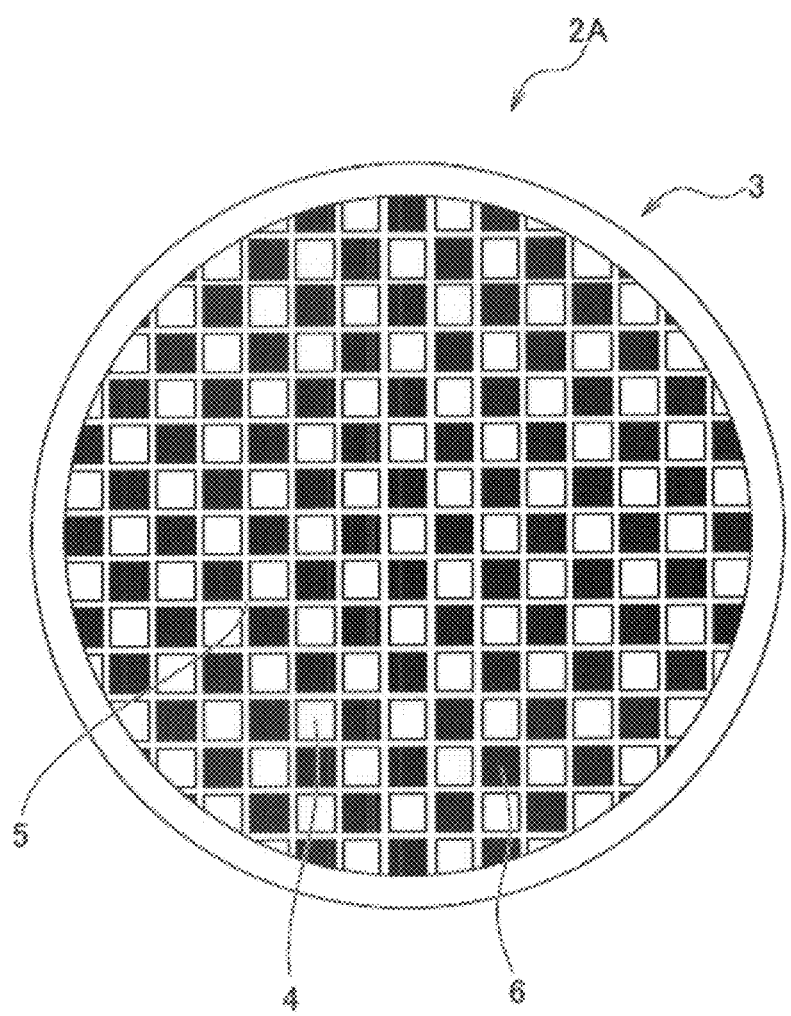
FIG. 2 is a view showing an end surface of the ceramic body with a honeycomb structure shown in FIG. 1.

FIG. 2 is a view showing an end surface of ceramic body 1 with a honeycomb structure shown in FIG. 1.

Through-holes 4 are sectioned off by partitions 5 at end surface (2A) of ceramic body 1 as shown in FIG. 2. Also, some end portions of through-holes 4 are sealed by sealant 6 while others are not sealed by sealant 6 and remain open as shown in FIG. 2. Namely, through-hole 4 is sealed by sealant 6 only at either end. Every alternate predetermined portion at end surface (2A) of ceramic body 1 is sealed so as to form a checkered pattern.

Figure 3:
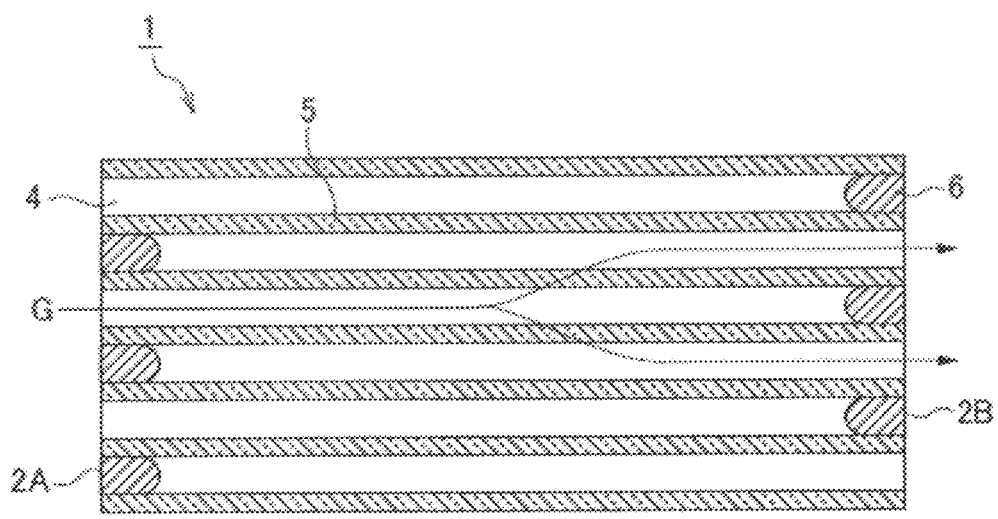
FIG. 3 is a cross-sectional view at line (A-A) of the ceramic body with a honeycomb structure shown in FIG. 1.

FIG. 3 is a cross-sectional view at line (A-A) of the ceramic body with a honeycomb structure shown in FIG. 1.

As shown in FIG. 3, one end surface (2A) is positioned on the inflow side, and exhaust gas (G) (exhaust gas from a diesel engine, for example) flows into open through-holes 4, passes through partitions 5 which section off through-holes 4, and flows out from other through-holes 4 that are open at the other end surface (2B) on the outflow side. Therefore, in ceramic body 1 with a honeycomb structure according to an embodiment of the present invention, partitions 5 can function as a filter to capture particulate matter (PM) or the like, for example, as a diesel particulate filter (DPF).

Next, a method for manufacturing a ceramic honeycomb structure is described in detail according to an embodiment of the present invention.

Figure 4:
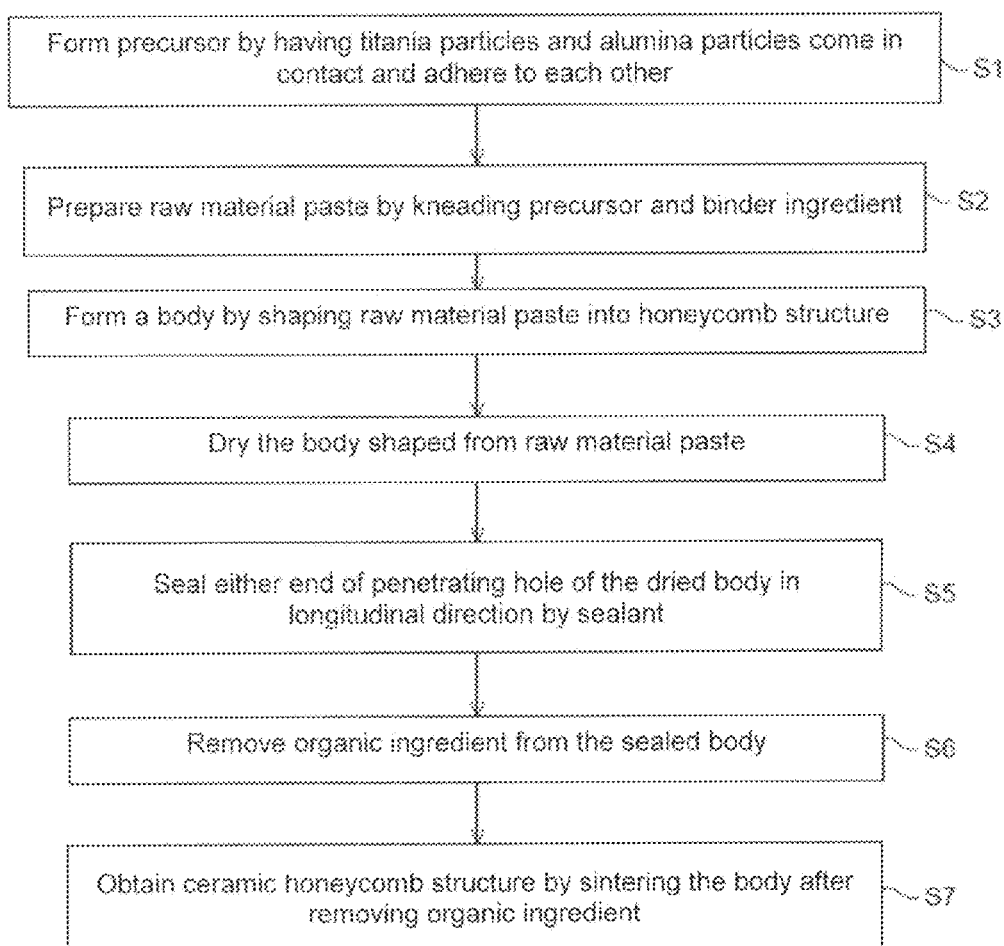
FIG. 4 is a flowchart showing an example of the manufacturing method according to an embodiment of the present invention.

FIG. 4 is a flowchart showing an example of the method for manufacturing a honeycomb structure according to an embodiment of the present invention.

An example of the method for manufacturing a ceramic honeycomb structure as shown in FIG. 4 includes the following: preconditioning treatment step (S1) for forming a precursor by having titania particles and alumina particles come in contact with and adhere to each other; preparation step (S2) for preparing raw material paste by kneading the precursor and binder ingredients; forming step (S3) for shaping the raw material paste into a honeycomb structure to form a body; drying step (S4) for drying the body shaped from the raw material paste; sealing step (S5) for sealing either end in a longitudinal direction of a through-hole of the dried body using a sealant; degreasing step (S6) for removing organic ingredients from the sealed body; and sintering step (S7) for sintering the body after the organic ingredients are removed so that a ceramic honeycomb structure is formed.

However, it is an option not to conduct drying step (S4), sealing step (S5) and degreasing step (S6) in the method for manufacturing a ceramic honeycomb structure. Namely, it is an option to conduct preconditioning treatment step (S1) for forming a precursor by having titania particles and alumina particles come in contact with and adhere to each other, preparation step (S2) for preparing raw material paste by kneading the precursor and binder ingredients, and forming step (S3) for shaping the raw material paste into a honeycomb structure to form a body, and directly afterward to conduct sintering step (S7) for obtaining a ceramic-honeycomb structure by sintering the body obtained by the above steps.

In the following, each step is described.

Preconditioning Treatment (S1)

Titania particles and alumina particles are made to come in contact with and adhere to each other to form a precursor (particle contact bodies formed of titania particles and alumina particles) in the preconditioning treatment step. Accordingly, precursor particles are obtained where titania particles and alumina particles are homogenously distributed and in contact with each other.

In the preconditioning treatment step, a precursor may also be formed by further adding a sintering additive to make it come in contact with titania particles and alumina particles (particle contact bodies formed of titania particles, alumina particles and particles of a sintering additive). As for sintering additives, mullite, zircornia, alkali feldspar, strontium feldspar and the like are listed.

In the present application, titania particles indicate those containing only titania particles, and alumina particles indicate those containing only alumina particles. Mullite particles as a sintering additive mean particles formed with alumina components and silicon dioxide components. Here, titania particles and alumina particles may also contain impurities. As for impurities, for example, silicon (Si), aluminum (Al), iron (Fe), calcium (Ca), magnesium (Mg), potassium (K), sodium (Na) and the like are listed.

In the present application, "homogenous" or "homogenize" indicates that titania particles and alumina particles are present evenly based on the amounts of substance (at a molar ratio). It is more preferred that an amount-of-substance ratio of titania to alumina in a precursor be in a range of 40:60~60:40, for example. An amount-of-substance ratio here means a ratio of the amount of substance of titania to the amount of substance of alumina, not a ratio of the amount of substance of titania particles to the amount of substance of alumina particles. Therefore, when mullite particles or the like are used when forming a precursor, an amount-of-substance ratio of titania to alumina is derived based on the sum (total amount of substance of alumina) of alumina derived from alumina particles and alumina derived from mullite particles.

To have titania particles and alumina particles come in contact with each other, the following may be employed, for example: a method in which a mixture containing titania particles and alumina particles is spray-dried; a method in which titania particles and alumina particles are granulated through a rolling motion; a method in which an aqueous dispersion of alumina particles is formed by dispersing alumina particles in a dispersion medium such as water, and then titania particles are immersed in the aqueous dispersion of alumina particles; or a method in which a mixture of titania particles and alumina particles is slurried and then dried while being mixed.

As for a method in which a mixture containing titania particles and alumina particles is spray-dried, for example, a mixture containing titania particles and alumina particles is slurried and spray-dried so that titania particles and alumina particles are homogenized.

In addition, as for another method of spray drying, for example, a binder ingredient to be used in a later-described preparation step is further added to the mixture containing titania particles and alumina particles at 5%~10% by mass based on the entire mass of titania particles, and then the mixture is spray-dried.

As for a method in which titania particles and alumina particles are granulated through a rolling motion, for example, titania particles, alumina particles and water are placed into an oscillating granulator and then put into a rolling motion to prepare a precursor; titania particles and water are placed into an oscillating granulator and put into a rolling motion, then alumina particles are added to the oscillating granulator and put into a rolling motion so that a precursor is prepared; and so forth. In such cases, a ratio of 5~10% by mass of water based on the entire mass of titania particles is used. Moreover, it is an option to use a binder ingredient (such as methylcellulose) along with water. A ratio of 5~10% by mass of the binder ingredient based on the entire mass of titania particles may be used.

As for a method in which titania particles are immersed in an aqueous dispersion of alumina particles, for example, alumina particles are dispersed in a dispersion medium such as water to form an aqueous dispersion, titania particles are immersed in the aqueous dispersion of alumina particles, and then a precursor, in which titania particles and alumina particles are homogenized and in contact with each other, is lifted from the aqueous dispersion of alumina particles.

As for a method in which a mixture containing titania particles and alumina particles is slurried and then dried while being mixed, for example, titania particles and alumina particles are slurried using a volatile solvent or the like to form a homogeneous mixture, which is then dried while being mixed.

In the preconditioning treatment step, the obtained precursor will not be sintered directly after the preconditioning treatment step. Uniform particle diameters of a precursor are thought to be easier to form while the precursor and binder ingredients can be kneaded in a short period of time.

By doing such a preconditioning treatment step, titania particles and alumina particles are more likely to come in contact with each other. Accordingly, precursor 7 is formed, where alumina particles 9 make contact with titania particle 8 to cover its surface, for example (FIG. 5).

Figure 5:
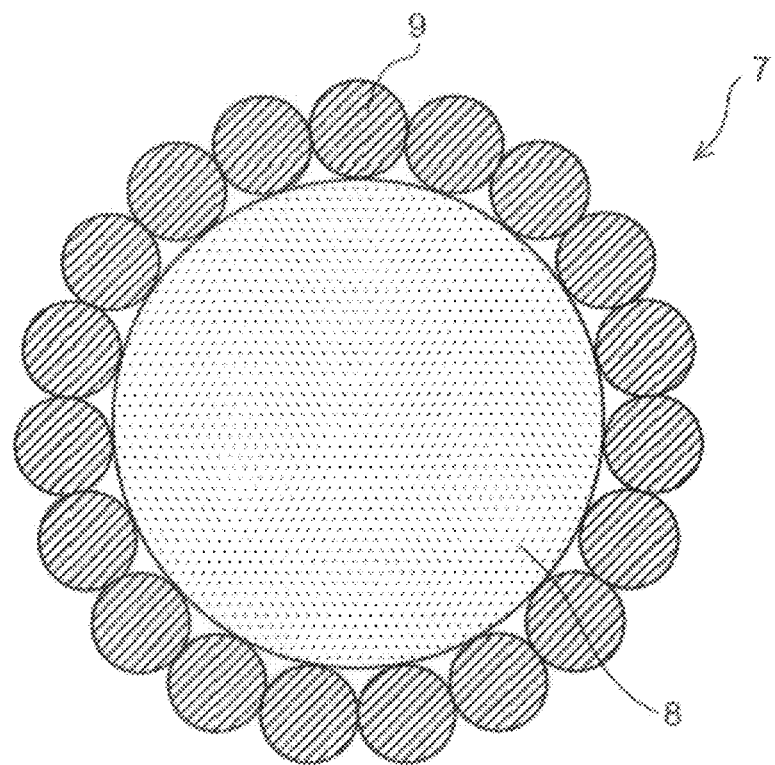
FIG. 5 is a view schematically showing an example of a precursor made of titania particles and alumina particles in an embodiment of the present invention.

FIG. 5 shows a state where titania particle 8 is covered with alumina particles 9. That is an example of a precursor. Here, the state of a precursor is not limited to such a size relationship between titania particles and alumina particles as shown in FIG. 5, and another state, where the size of alumina particles is greater than that of titania particles and the surface of an alumina particle is covered with titania particles, may be employed. In addition, yet another state, where the size of titania particles is substantially the same as that of alumina particles, may also be employed.

Figure 6:
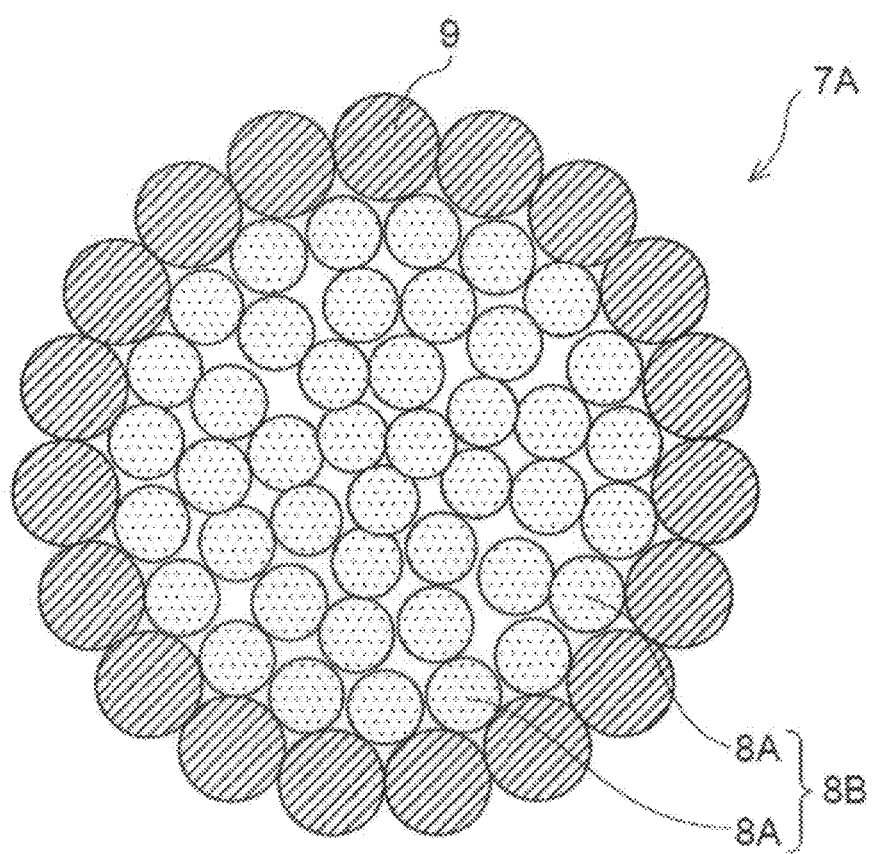
FIG. 6 is a view schematically showing another example of a precursor made of titania particles and alumina particles in an embodiment of the present invention.

Also, when an aggregate of primary particles is used for titania particles, titania particles and alumina particles are even more likely to come in contact with each other by performing a preconditioning treatment step as described above. For example, as shown in FIG. 6, a precursor (7A) is formed, where titania particles (secondary particles) (8B) made of aggregate titania particles (primary particles) (8A) are covered with alumina particles 9.

In the present application, a "precursor" means a granular material where titania particles and alumina particles make contact with and adhere to each other.

When titania particles, alumina particles and mullite particles make contact with and adhere to each other, a precursor (a particle contact body of titania particles, alumina particles and mullite particles) is formed by the same methods described above for having titania particles and alumina particles come in contact with each other.

To have titania particles, alumina particles and mullite particles come in contact with each other, the following may be employed, for example: a method in which a mixture containing titania particles, alumina particles and mullite particles is spray-dried; a method in which titania particles, alumina particles and mullite particles are granulated through a rolling motion; a method in which a mixed aqueous dispersion of alumina particles and mullite particles is formed by dispersing alumina particles and mullite particles in a dispersion medium such as water, and then titania particles are immersed in the mixed aqueous dispersion; or a method in which a mixture of titania particles, alumina particles and mullite particles is slurried and then dried while being mixed.

As for titania particles and alumina particles used in the preconditioning treatment step, it is an option for titania particles and alumina particles in a precursor to be combined at an amount-of-substance ratio of titania to alumina in a range of 40:60~60:40, for example. It is also preferable to combine titania particles and alumina particles in a precursor at an amount-of-substance ratio of titania to alumina in a range of 45:55~55:45, for example. However, if mullite particles are used when preparing a precursor as described above, the value obtained by totaling the alumina derived from alumina particles and the alumina derived from mullite particles corresponds to the amount of substance of alumina. Therefore, when mullite particles are used in the preconditioning treatment step, it is preferred to combine mullite particles with titania particles and alumina particles in an amount-of-substance ratio of titania to alumina that is within the above range.

When titania particles and alumina particles are combined in a preconditioning treatment step, their weight ratio is, for example, in a range of 35:65~55:45, more preferably, 40:60~50:50. The amount of unreacted titania or alumina remaining after sintering is reduced if combined within such a ratio.

Particle diameters of titania particles and alumina particles are not limited specifically. For example, when particle diameters of titania particles and alumina particles are compared, it is an option to employ any of the following: the diameter of titania particles is greater than that of alumina particles; the diameter of titania particles is smaller than that of alumina particles; or the diameter of titania particles is substantially the same as that of alumina particles.

In a preconditioning treatment step, when alumina particles are used with titania particles having a particle diameter greater than that of alumina particles, it is referred to as a "first embodiment" in the following. In addition, when alumina particles are used with titania particles having a particle diameter smaller than that of alumina particles, it is referred to as a "second embodiment" and described in the following. Moreover, when alumina particles are used with titania particles having a particle diameter substantially the same as that of alumina particles, it is referred to as a "third embodiment" and described in the following.

In the first embodiment, when alumina particles are combined with titania particles having a particle diameter greater than alumina particles, that makes it easier to form a precursor where multiple alumina particles are in contact with the surface of a titania particle.

As for the particle diameter of titania particles in the first embodiment, the mean volume particle diameter is 5 µm~20 µm, for example. Also, particles with a mean volume particle diameter of 8 µm~18 µm or the like may be used. Here, it is an option to use primary particles of titania particles or secondary particles which are aggregate primary particles, or to use a combination thereof.

In the present application, mean volume particle diameters are measured using a laser diffraction particle size distribution analyzer (Beckman Coulter Inc.).

As for the particle diameter of alumina particles in the first embodiment, the mean volume particle diameter is 2 µm~5 µm, for example.

In the present application, the type of alumina particles is not limited specifically. For example, α-alumina particles, γ-alumina particles, a combination of α-alumina particles and γ-alumina particles, or the like may be used. In addition, alumina particles may be primary particles, secondary particles that are aggregate primary particles, or a combination thereof.

In the first embodiment, the ratio of particle diameters of titania particles and alumina particles is not limited specifically, and it may be in a range of 10:1~10:3, for example.

A second embodiment is described in the following, using alumina particles and titania particles having a smaller particle diameter than alumina particles.

To have titania particles and alumina particles come in contact with each other in the second embodiment, the following may be employed, for example: a method in which a mixture containing titania particles and alumina particles is spray-dried; a method in which titania particles and alumina particles are granulated through a rolling motion; a method in which an aqueous dispersion of alumina particles is formed by dispersing alumina particles in a dispersion medium such as water and then titania particles are immersed in the aqueous dispersion of alumina particles; or a method in which a mixture of titania particles and alumina particles is slurried, and is dried while being mixed. As for a method for granulating titania particles and alumina particles through a rolling motion, a precursor may also be prepared when alumina particles and water are placed into an oscillating granulator, put into a rolling motion, and then titania particles are added into the oscillating granulator and put into a rolling motion.

As for the particle diameter of titania particles in the second embodiment, the mean volume particle diameter is 0.1 μm~0.8 μm or 0.2 μm~0.5 μm, for example.

As for the particle diameter of alumina particles in the second embodiment, the mean volume particle diameter is 2 μm~5 μm, for example.

In the second embodiment, it is easier to form a precursor where titania particles are in contact with the surface of an alumina particle.

In the second embodiment, the ratio of particle diameters of titania particles and alumina particles is not limited specifically, and it may be in a range of 1:4~1:10, for example.

Furthermore, a third embodiment is described, using titania particles and alumina particles having substantially the same particle diameters as each other in a preconditioning treatment step.

To have titania particles and alumina particles come in contact with each other in the second embodiment, the following may be employed, for example: a method in which a mixture containing titania particles and alumina particles is spray-dried; a method in which titania particles and alumina particles are granulated through a rolling motion; a method in which an aqueous dispersion of alumina particles is formed by dispersing alumina particles in a dispersion medium such as water and then titania particles are immersed in the aqueous dispersion of alumina particles; a method in which an aqueous dispersion of titania particles is formed by dispersing titania particles in a dispersion medium such as water and then alumina particles are immersed in the aqueous dispersion of titania particles; or a method in which a mixture of titania particles and alumina particles is slurried, and is dried while being mixed.

As for the particle diameter of titania particles in the third embodiment, the mean volume particle diameter is 1 μm~5 μm or 1 μm~3 μm, for example.

As for the particle diameter of alumina particles in the third embodiment, the mean volume particle diameter is 2 μm~5 μm, for example.

In the third embodiment, titania particles with a particle diameter substantially the same as that of alumina particles are combined with alumina particles. That makes it easier to form a mixture of a precursor where multiple alumina particles are in contact with the surface of a titania particle, a precursor where multiple titania particles are in contact with the surface of an alumina particle, and the like.

In the third embodiment, the ratio of particle diameters of titania particles and alumina particles is not limited specifically, and it may be in a range of 1.0:0.3~1.0:4.0, for example.

As for the particle diameter of mullite particles to be used in addition to titania particles and alumina particles when needed, the mean volume particle diameter is 0.1 μm~45 μm, for example. Alternatively, a mean volume particle diameter of 0.1 μm~20 μm, 0.5 μm~10 μm and so forth, for example, may also be used. When a body is sintered and aluminum titanate is formed, unreacted aluminum and silicon contained in mullite particles are thought to melt and work as a binder which fills spaces in aluminum titanate.

The mullite particles may be primary particles, secondary particles which are aggregate primary particles, or a combination thereof.

It is an option for the powder of titania particles (titania powder) containing titania particles used for a precursor to include impurities such as silicon (Si), aluminum (Al), iron (Fe), calcium (Ca), magnesium (Mg), potassium (K) and sodium (Na). In the present application, "titania particle powder" means bulk (material, raw material) of titania particles to be used in a method for manufacturing a ceramic honeycomb structure. Here, impurities in titania powder may be such that are contained inevitably during a process of manufacturing titania, or may be such that are mixed into titania powder separately. In addition to impurities that make solid solutions with titania particles, other impurities that are present outside titania particles of titania powder may also be included.

It is thought that those impurities contribute to suppressing aluminum titanate, which is manufactured using a precursor where titania particles and alumina particles are in contact with and adhere to each other, from being decomposed into titania and alumina in a high temperature range, or to improving the mechanical strength of aluminum titanate.

The amount of impurities is adjusted by controlling the amount of impurities contained in raw titania material such as $Ti(OH)_4$ (titania powder) or the like or by cleansing titania compounds by using acids, alkalis or the like.

The amount of iron in titania powder is preferred to be at a weight ratio of 200 ppm~1000 ppm in the titania powder in terms of $Fe_2O_3$. When the amount of iron in titania powder is in the above range, it is thought that aluminum titanate formed when part of $Al^{3+}$ is displaced by $Fe^{2+}$ is suppressed from being decomposed into titania and alumina in a high temperature range.

The amount of silicon contained in titania powder is preferred to be 0.1 wt. %~1.0 wt. % of the titania powder in terms of $SiO_2$. When the amount of silicon in titania powder is in the above range, it is thought that aluminum titanate formed when part of $Al^{3+}$ is displaced by $Si^{4+}$ is suppressed from being decomposed into titania and alumina in a high temperature range.

No magnesium is preferred to be contained in titania powder. When contained, the amount of magnesium in titania powder is preferred to be at a weight ratio of 500 ppm or lower in the titania powder in terms of MgO. Since MgO tends to absorb water, if MgO exists at particle boundaries among aluminum titanate particles, it is thought MgO may cause cracking due to expansion from moisture absorption. Thus, the amount of magnesium in titanate powder is preferred to be within the above range. Alternatively, it is preferred that no magnesium, or substantially no magnesium (at or below the detection limit), be contained in titania powder.

The amount of potassium in titania powder is preferred to be at a weight ratio of 100 ppm~600 ppm in the titania powder in terms of $K_2O$. In addition, the amount of sodium in titania powder is preferred to be at a weight ratio of 200 ppm~1000 ppm in the titania powder in terms of $Na_2O$. It is thought that $K_2O$ and $Na_2O$ work as sintering additives for sinter bonding aluminum titanate particles to each other so as to suppress cracking at particle boundaries among aluminum titanate particles. Thus, the amounts of potassium and sodium in titania powder are preferred to be in the above ranges.

Preparation of Raw Material Paste (S2)

In a raw material paste preparation step, raw material paste is prepared by kneading binder ingredients and a precursor formed to have alumina particles and titania particles come in contact homogeneously.

A method for kneading a precursor and binder ingredients is not limited specifically, and a mixer, a kneader, a media mixing mill (attritor), a pressure kneader (muller) or the like may be used for kneading.

As for a binder ingredient, the following are listed: celluloses such as methylcellulose, carboxymethyl cellulose and sodium carboxymethyl cellulose; alcohols such as polyvinyl alcohol; salts such as lignosulfonate; waxes such as paraffin wax and microcrystalline wax; and thermoplastic resins such as EVA, polyethylene, liquid-crystal polymer and engineering plastics.

The amount of a binder ingredient to be added is, for example, 0.1%~20% by mass based on 100% by mass of a precursor. It may be 1%~15% by mass, for example. To prepare raw material paste, other ingredients may be added to a precursor and binder ingredients.

As for other ingredients, pore-forming agents, lubricants, plasticizers, dispersing agents, solvents and the like are listed.

For pore-forming agents, the following are listed: carbon materials such as graphite; resins such as polyethylene, polypropylene and polymethylmethacrylate; plant-based materials such as starch, nut shells, walnut shells and corn; ice; dry ice; and the like.

The amount of a pore-forming agent to be added is 0.1%~30% by mass based on 100% by mass of a precursor. It may be 1%~20% by mass, for example.

For lubricants and plasticizers, the following are listed, for example: alcohols such as glycerin; higher fatty acids such as caprylic acid, lauric acid, palmitic acid, alginic acid, oleic acid and stearic acid; and metal stearate such as aluminum stearate.

The amount of a lubricant or plasticizer to be added is 0.01%~5% by mass based on 100% by mass of a precursor. It may be 0.1%~1% by mass.

As for dispersing agents, the following, for example, are listed: inorganic acids such as nitric acid, hydrochloric acid and sulfuric acid; organic acids such as oxalic acid, citric acid, acetic acid, malic acid and lactic acid; alcohols such as methanol, ethanol and propanol; surfactants such as ammonium polycarboxylate and polyoxyalkylene alkyl ether; and so forth.

The amount of a dispersing agent to be added is 0.01%~10% by mass based on 100% by mass of a precursor. It may be 0.05%~2% by mass.

As for solvents, the following are listed, for example: alcohols such as methanol, ethanol, butanol and propanol; glycols such as propylene glycol, polypropylene glycol and ethylene glycol; water; and the like.

The amount of a solvent to be used is 0.1%~50% by mass. It may be 10%~40% by mass.

Forming of Honeycomb Structural Body (S3)

In a honeycomb structural body forming step, a body is formed by shaping the raw material paste into a honeycomb structure.

Forming raw material paste into a shape is not limited specifically, and extrusion methods using a honeycomb die or the like may be employed.

Drying (S4)

In a drying step, a body shaped from the raw material paste is dried.

Dryers for a drying step are not limited to any specific type, and the following are listed: microwave dryers, hot-air dryers, dielectric heating dryers, reduced-pressure dryers, vacuum dryers, freeze dryers and the like.

The duration and temperature for drying are set appropriately according to the volume or the like of a honeycomb body.

Sealing of Through-Holes (S5)

In a through-hole sealing step, either end of a through-hole in the dried body in their longitudinal direction is sealed using a sealant.

Application of a sealant to a honeycomb body is not limited specifically. There are methods such as immersing an end surface of a body into sealant slurry, injecting a sealant into a through-hole from an end surface using an injector, and the like.

As for a sealant, it is not limited to any specific type. For example, raw material paste made of titania particles and alumina particles, or made of other ceramic, may be used.

Sealant slurry is prepared by adding a binder ingredient, water or the like to titania particles and alumina particles, for example. The viscosity of sealant slurry is adjusted properly according to the type and the like of the sealant.

It is an option to conduct a sealing step after a sintering step.

Degreasing of Honeycomb Structural Body (S6)

In a degreasing step, organic ingredients are removed from the sealed body.

Conditions for removing organic ingredients from the sealed honeycomb body are not limited specifically, and may be selected according to the type and amount of organic ingredients contained in the honeycomb body. For example, degreasing is conducted at 150° C.~800° C. for two hours.

Sintering of Honeycomb Structural Body (S7)

In a sintering step, a ceramic honeycomb structure is obtained by sintering a body from which organic ingredients have been removed.

Sintering is not limited to any specific method and is conducted using a sintering furnace such as an electric tube furnace, electric box furnace, tunnel kiln, far infrared furnace, microwave heater, shaft kiln, reverberatory furnace, rotary-hearth furnace or roller-hearth furnace.

As for sintering methods, a body may be sintered batch by batch or continuously. Alternatively, a body may be settled or circulated while being sintered.

The sintering temperature is 1350° C. or higher, for example, and it may be set at 1400° C. or higher. In addition, the sintering temperature is 1650° C. or lower, for example, and it may be set at 1550° C. or lower.

The programmed rate of the sintering temperature is not limited specifically, and it may be set at 1° C./hour~500° C./hour, for example.

Sintering a honeycomb body is conducted under oxygen atmosphere such as atmospheric air, for example.

The duration for sintering a honeycomb body differs depending on the amount of raw material paste, the type of sintering furnace, the sintering temperature, the sintering atmosphere and the like. It may be set for 10 minutes~24 hours, for example.

Ceramic Body Having Honeycomb Structure

A ceramic honeycomb structure according to an embodiment of the present invention is obtained by a manufacturing method that includes the following: a preconditioning treatment step for forming a precursor by having titania particles and alumina particles come in contact with each other; a preparation step for preparing raw material paste by kneading the precursor and binder ingredients; a forming step for shaping the raw material paste into a honeycomb structure to form a body; and a sintering step for sintering the body to obtain a ceramic body with a honeycomb structure.

When an element analysis is performed on the obtained ceramic body using a scanning electron microscope (S-4800, Hitachi, Ltd.) and an energy dispersive X-ray spectrometer (EMAX Energy EX-250, Horiba, Ltd.), the ratio (weight ratio) of titania and alumina in a ceramic body is preferred to be in a range of 7:10~4:10, more preferably in a range of 6:10~5:10.

In addition, it is preferred that titania be contained at 15 wt. %~50 wt. % and alumina at 45 wt. %~70 wt. % of the entire weight of the obtained ceramic body; more preferably, titania at 22 wt. %~40 wt. % and alumina at 55 wt. %~65 wt. %. Furthermore, it is an option for silica to be contained at 1 wt. %~20 wt. % or 3 wt. %~15 wt. % of the entire weight of the obtained ceramic body.

Partitions of a ceramic body with a honeycomb structure can function as a filter to capture particulate matter (PM).

Therefore, a ceramic honeycomb structure can function, for example, as a diesel particulate filter (DPF) or the like.

EXAMPLES

Examples according to the present invention are further described in detail. However, the present invention is not limited to such examples.

Example 1

Eight parts by weight of titania particles with a mean volume particle diameter of 12 µm (brand name $TiO_2$ 3020 (registered mark), Kronos Incorporated), 10 parts by weight of alumina particles with a mean volume particle diameter of 3 µm (brand name $Al_2O_3$ RMA (registered mark), Alcan Inc.), and 40 parts by weight of water are placed into a spray dryer (G8210-A, Yamato Scientific Co., Ltd.) and spray dried to form a precursor.

The precursor, 6 parts by weight of alumina particles, 3 parts by weight of silicon dioxide, 20 parts by weight of pore-forming graphite (brand name A625, Asbury Graphite Mills, Inc.) and 4.5 parts by weight of methyl cellulose (brand name METOLOSE 60SH, Shin-Etsu Chemical Co., Ltd.) are placed into a kneader (brand name Mix Muller, Shinto Kogyo K.K.) and kneaded to prepare raw material paste.

The raw material paste is extruded through a honeycomb die to form a body with a honeycomb structure having approximately 300 cpsi (approximately 46.5 cell/$cm^2$) with a partition thickness of approximately 0.010 inch (approximately 0.25 mm). The raw material paste is shaped into a body with a length of 150 mm and a diameter of 143.8 mm.

Then, a body is cut to a desired length and dried for 20 minutes using both microwave (2.45 GHz, 20 kW) and hot air (140° C., air speed of 1 m/s).

Next, sealant slurry is prepared from the same raw material paste as used for the honeycomb body.

Masking films are put on both end surfaces of the dried body. Then, the masking films are bored into a checkered pattern so that the ceramic body with a honeycomb structure obtained after sintering is sealed in checkered patterns which are complementary on one end surface and on the other end surface of the ceramic body. Accordingly, a masked body is formed. As for masking film, a tape with an adhesive layer (adhesive force of 5.3 N/cm) made by forming acrylic adhesive on a polyester base is used.

The portion from an end sealed with masking film to a point 5 mm upward in a longitudinal direction of a dried body is immersed into sealant slurry. Then, the body is lifted from the sealant slurry. In the same manner, the other end of the body in a longitudinal direction is also immersed into the sealant slurry and lifted from the sealant slurry. Accordingly, a sealed body is obtained.

Under atmospheric air, the sealed body is heated from room temperature to 200° C. at a programmed rate of 40° C./hour; when the temperature has reached 200° C., it is heated to 300° C. at a programmed rate of 10° C./hour; when the temperature has reached 300° C., it is heated to 450° C. at a programmed rate of 40° C./hour; the temperature is kept at 450° C. for 5 hours to degrease the body; and it is heated at a programmed rate of 500° C./hour to 1450° C., where it is kept for 5 hours to sinter the body. Accordingly, a ceramic body with a honeycomb structure is obtained.

An element analysis is performed on the obtained ceramic body using a scanning electron microscope (S-4800, Hitachi, Ltd.) and an energy dispersive X-ray spectrometer (EMAX Energy EX-250, Horiba, Ltd.). As a result, the ratio (weight ratio) of titania and alumina in the ceramic body is found in a range of 6:10~5:10.

Example 2

Eight parts by weight of titania particles with a mean volume particle diameter of 12 µm (brand name $TiO_2$ 3020 (registered mark), Kronos Incorporated), 9 parts by weight of alumina particles with a mean volume particle diameter of 3 µm (brand name $Al_2O_3$ RMA (registered mark), Alcan Inc.), 2 parts by weight of mullite particles with a mean volume particle diameter of 0.7 µm (brand name KM102, KCM Corporation Co., Ltd.), and 40 parts by weight of water are placed into a spray dryer (G8210-A, Yamato Scientific Co., Ltd.) and spray dried. Accordingly, a precursor is produced.

The precursor, 6 parts by weight of alumina particles, 20 parts by weight of pore-forming graphite (brand name A625, Asbury Graphite Mills, Inc.) and 4.5 parts by weight of methyl cellulose (brand name METOLOSE 60SH, Shin-Etsu Chemical Co., Ltd.) are placed into a kneader (brand name Mix Muller, Shinto Kogyo K.K.) and kneaded to prepare raw material paste.

The same as in Example 1, a body shaped from the raw material paste is cut to a desired length, dried, sealed, degreased and sintered. Accordingly, a ceramic body with a honeycomb structure is obtained.

Example 3

Eight parts by weight of titania particles with a mean volume particle diameter of 1 µm~2 µm (brand name TI-0059, Soekawa Chemical Co., Ltd.), 10 parts by weight of α-alumina particles with a mean volume particle diameter of 2 µm~3 µm (brand name AL-0123, Soekawa Chemical Co., Ltd.), and 40 parts by weight of water are placed into a spray dryer (G8210-A, Yamato Scientific Co., Ltd.) and spray dried. Accordingly, a precursor is produced.

The precursor, 6 parts by weight of α-alumina particles, 20 parts by weight of pore-forming graphite (brand name A625, Asbury Graphite Mills, Inc.), and 4.5 parts by weight of methyl cellulose (brand name METOLOSE 60SH, Shin-Etsu Chemical Co., Ltd.) are placed into a kneader (brand name Mix Muller, Shinto Kogyo K.K.) and kneaded to prepare raw material paste.

The same as in Example 1, a body shaped from the raw material paste is cut to a desired length, dried, sealed, degreased and sintered. Accordingly, a ceramic body with a honeycomb structure is thought to be obtained based on the accumulated knowledge of the inventor.

Example 4

Eight parts by weight of titania particles with a mean volume particle diameter of 0.3 µm~0.5 µm (brand name TI-0068, Soekawa Chemical Co., Ltd.), 10 parts by weight of γ-alumina particles with a mean volume particle diameter of 2 µm~3 µm (brand name AL-0147, Soekawa Chemical Co., Ltd.), and 40 parts by weight of water are placed into a spray dryer (G8210-A, Yamato Scientific Co., Ltd.) and spray dried. Accordingly, a precursor is produced.

The precursor, 6 parts by weight of γ-alumina particles, 20 parts by weight of pore-forming graphite (brand name A625, Asbury Graphite Mills, Inc.), and 4.5 parts by weight of methyl cellulose (brand name METOLOSE 60SH, Shin-Etsu Chemical Co., Ltd.) are placed into a kneader (brand name Mix Muller, Shinto Kogyo K.K.) and kneaded to prepare raw material paste.

The same as in Example 1, a body shaped from the raw material paste is cut to a desired length, dried, sealed, degreased and sintered. Accordingly, a ceramic body with a honeycomb structure is thought to be obtained based on the accumulated knowledge of the inventor.

EVALUATION

The components that form ceramic bodies obtained in Examples 1 and 2 are analyzed using an X-ray diffractometer (D8 DISCOVER, Bruker AXS GmbH). The more the amount of detected alumina and titania, and the less the amount of aluminum titanate, it is found that the ratios of remaining unreacted alumina and titania in the raw material are high and that aluminum titanate corresponding to such ratios is not produced.

As a result of the analysis, the ratio of remaining alumina in the ceramic body obtained in Examples 1 and 2 is approximately 6%~9%. The ratio of alumina in ceramic bodies obtained in Examples 3 and 4 is thought to be approximately the same.

Distribution of pores and the size of pores in partitions are constant in the ceramic bodies obtained in Examples 1 and 2.

A method for manufacturing a ceramic honeycomb structure according to an embodiment of the present invention includes the following: a preconditioning treatment step for forming a precursor by having titania particles and alumina particles come in contact with and adhere to each other; a preparation step for preparing raw material paste by kneading the precursor and binder ingredients; a forming step for shaping the material paste into a honeycomb structure to form a body; and a sintering step for sintering the body to obtain a ceramic body with a honeycomb structure.

Another embodiment of the present invention is a ceramic body obtained by a method for manufacturing a ceramic honeycomb structure which includes the following: a preconditioning treatment step for forming a precursor by having titania particles and alumina particles come in contact with and adhere to each other; a preparation step for preparing raw material paste by kneading the precursor and binder ingredients; a forming step for shaping the raw material paste into a honeycomb structure to form a body; and a sintering step for sintering the body to obtain a ceramic body with a honeycomb structure.

Obviously, numerous modifications and variations of the present invention are possible in light of the above teachings. It is therefore to be understood that within the scope of the appended claims, the invention may be practiced otherwise than as specifically described herein.

What is claimed is:

1. A method for manufacturing a ceramic body having a honeycomb structure, comprising:
    bringing titania particles, alumina particles and a sintering additive into contact with each other such that the sintering additive, the titania particles and the alumina particles are adhered to each other and form a precursor comprising particles comprising the sintering additive, the titania particles and the alumina particles;
    combining the precursor with a binder material such that a raw material paste comprising the precursor and the binder material is prepared;
    forming a body comprising the raw material paste and having a honeycomb structure; and
    sintering the body having the honeycomb structure such that a ceramic body having the honeycomb structure is formed,
    wherein the sintering additive is mullite particles, the precursor has an amount-of-substance ratio of titania to alumina such that the ceramic body comprises titania in an amount of 22 wt. % to 40 wt. % and alumina in an amount of 59.3 wt. % to 65 wt. % with respect to an entire weight of the ceramic body, and the amount-of-substance ratio of titania to alumina in the precursor is derived based on a sum of alumina derived from the alumina particles and alumina derived from the mullite particles.

2. The method for manufacturing a ceramic body having a honeycomb structure of claim 1, further comprising applying a sealing material to one end of each of through-holes in the honeycomb structure of the body such that the sealing material seals each of the through-holes in the honeycomb structure at the one end.

3. The method for manufacturing a ceramic body having a honeycomb structure of claim 1, further comprising drying the body comprising the raw material paste and having the honeycomb structure prior to the sintering.

4. The method for manufacturing a ceramic body having a honeycomb structure of claim 1, further comprising degreasing the body comprising the raw material paste and having the honeycomb structure such that an organic material is removed from the body comprising the raw material paste and having the honeycomb structure prior to the sintering.

5. The method for manufacturing a ceramic body having a honeycomb structure of claim 1, the bringing of the sintering additive, the titania particles and the alumina particles into contact with each other comprises preparing a mixture comprising the sintering additive, the titania particles and the alumina particles and spray-drying the mixture comprising the sintering additive, the titania particles and the alumina particles such that the precursor comprising particles comprising the sintering additive, the titania particles and the alumina particles is formed.

6. The method for manufacturing a ceramic body having a honeycomb structure of claim 1, wherein the titania particles have a mean volume particle diameter in a range of from 5 μm to 20 μm.

7. The method for manufacturing a ceramic body having a honeycomb structure of claim 1, wherein the titania particles have a mean volume particle diameter in a range of from 0.1 μm to 0.8 μm.

8. The method for manufacturing a ceramic body having a honeycomb structure of claim 1, wherein the titania particles have a mean volume particle diameter in a range of from 1 μm to 5 μm.

9. The method for manufacturing a ceramic body having a honeycomb structure of claim 1, wherein the alumina particles have a mean volume particle diameter in a range of from 2 μm to 5 μm.

10. The method for manufacturing a ceramic body having a honeycomb structure of claim 1, wherein the titania particles and the alumina particles have a ratio of a particle diameter of the titania particles to a particle diameter of the alumina particles in a range of from 10:1 to 10:3.

11. The method for manufacturing a ceramic body having a honeycomb structure of claim 1, wherein the binder material includes at least one binder selected from the group consisting of a cellulose, an alcohol, a salt, a wax and a thermoplastic resin.

12. The method for manufacturing a ceramic body having a honeycomb structure of claim 1, wherein the bringing of the sintering additive, the titania particles and the alumina particles into contact with each other comprises combining a titania powder comprising the titania particles and an alumina powder comprising the alumina particles, and the titania powder includes iron in an amount of from 200 ppm to 1,000 ppm with respect to the titania powder in a weight ratio based on conversion of $Fe_2O_3$.

13. The method for manufacturing a ceramic body having a honeycomb structure of claim 1, wherein the bringing of the sintering additive, the titania particles and the alumina particles into contact with each other comprises combining a titania powder comprising the titania particles and an alumina powder comprising the alumina particles, and the titania powder includes silicon in an amount of from 0.1 wt. % to 1.0 wt. % with respect to the titania powder based on conversion of $SiO_2$.

14. The method for manufacturing a ceramic body having a honeycomb structure of claim 1, wherein the bringing of the sintering additive, the titania particles and the alumina particles into contact with each other comprises combining a titania powder comprising the titania particles and an alumina powder comprising the alumina particles, and the titania powder includes potassium in an amount of from 100 ppm to 600 ppm with respect to the titania powder in a weight ratio based on conversion from $K_2O$.

15. The method for manufacturing a ceramic body having a honeycomb structure of claim 1, wherein the bringing of the sintering additive, the titania particles and the alumina particles into contact with each other comprises combining a titania powder comprising the titania particles and an alumina powder comprising the alumina particles, and the titania powder includes sodium in an amount of from 200 ppm to 1,000 ppm with respect to the titania powder in a weight ratio based on conversion from $Na_2O$.

16. The method for manufacturing a ceramic body having a honeycomb structure of claim 1, wherein the bringing of the sintering additive, the titania particles and the alumina particles into contact with each other comprises combining a titania powder comprising the titania particles and an alumina powder comprising the alumina particles, and the titania powder does not contain magnesium or includes magnesium in an amount of 500 ppm or less with respect to the titania powder in a weight ratio based on conversion from MgO.

17. The method for manufacturing a ceramic body having a honeycomb structure of claim 1, further comprising adding a pore-forming agent such that the raw material paste comprising the precursor, the binder material and the pore-forming agent is prepared.

18. The method for manufacturing a ceramic body having a honeycomb structure of claim 1, further comprising adding a pore-forming agent such that the raw material paste comprising the precursor, the binder material and the pore-forming agent is prepared, wherein the pore-forming agent is at least one material selected from the group consisting of a graphite material, a polyethylene material, a polypropylene material, a polymethylmethacrylate material, a starch material, a nut shell material, a walnut shell material, a corn material, an ice material, and a dry ice material.

19. The method for manufacturing a ceramic body having a honeycomb structure of claim 1, further comprising adding a pore-forming agent such that the raw material paste comprising the precursor, the binder material and the pore-forming agent is prepared, wherein the pore-forming agent is added in an amount in a range of 0.1% to 30% by mass based on 100% by mass of the precursor.

20. The method for manufacturing a ceramic body having a honeycomb structure of claim 1, wherein the titania particles have a mean volume particle diameter in a range of from 5 μm to 20 μm, and the alumina particles have a mean volume particle diameter in a range of from 2 μm to 5 μm.

* * * * *